United States Patent
Lebkuchner et al.

(10) Patent No.: US 8,303,184 B1
(45) Date of Patent: Nov. 6, 2012

(54) MOTOR PUMP BEARING

(75) Inventors: Benno Lebkuchner, Thompson, CT (US); Hans L. Kuster, Barrington, RI (US)

(73) Assignee: AquaMotion, Inc., Barrington, RI (US)

( * ) Notice: Subject to any disclaimer, the term of this patent is extended or adjusted under 35 U.S.C. 154(b) by 1022 days.

(21) Appl. No.: 12/136,851

(22) Filed: Jun. 11, 2008

(51) Int. Cl.
*F16C 17/00* (2006.01)
*F16C 17/14* (2006.01)
*F04B 35/04* (2006.01)

(52) U.S. Cl. .......... 384/215; 384/279; 384/902; 310/90; 417/423.12

(58) Field of Classification Search .................. 384/279, 384/902, 202, 215; 310/90; 417/423.12, 417/473.14
See application file for complete search history.

(56) References Cited

U.S. PATENT DOCUMENTS

| | | | | |
|---|---|---|---|---|
| 3,592,517 | A | * | 7/1971 | Harris ............................ 384/215 |
| 4,274,874 | A | * | 6/1981 | Obara et al. .................... 384/92 |
| 4,990,068 | A | | 2/1991 | Zhong |
| 5,549,459 | A | | 8/1996 | Nixon |
| 7,766,550 | B2 | * | 8/2010 | Larue ............................ 384/119 |

FOREIGN PATENT DOCUMENTS

JP 62-133028 * 6/1987

\* cited by examiner

*Primary Examiner* — William C Joyce
(74) *Attorney, Agent, or Firm* — Salter & Michaelson

(57) ABSTRACT

A bearing that is used in a motor pump in which a liquid is, not only pumped by means of an impeller driven by the pump, but also is used to lubricate components of the motor pump including the motor pump shaft. The bearing is for supporting the shaft at at least one location of the shaft. The bearing is constructed of a bronze material having added thereto a small amount of graphite, preferably around 2.5%.

13 Claims, 3 Drawing Sheets

MOTOR PUMP BEARING

RELATED APPLICATION

This application relates to an application in the name of the same inventor entitled "MOTOR PUMP", and filed of even date herewith, and assigned U.S. Ser. No. 12/136,873, filed on Jun. 11, 2008 and now issued as U.S. Pat. No. 8,008,500. This co-pending application is hereby incorporated by reference herein in its entirety.

FIELD OF THE INVENTION

The present invention relates in general to an improved bearing for use with a motor driven pump. The present invention is directed to an improved bearing material that can be particularly used in constructing bearings for a canned motor pump.

BACKGROUND OF THE INVENTION

Canned motor pumps are widely used to circulate water in heating and plumbing systems. Examples of canned motor pumps are found in U.S. Pat. Nos. 4,990,068 and 5,549,459. Canned motor pumps are lubricated by the fluid being pumped which typically is water. These pumps are commonly referred to as water lubricated pumps. The pumps are typically driven by an electric motor and the rotor of the motor, as well as the pump impeller, are mounted on a common shaft. An inherent feature of canned motor pumps is that all rotating parts are immersed in the fluid being pumped. Because of that they generally do not require any dynamic seals such as packings or mechanical seals. Since the shaft is immersed in the fluid being pumped, it follows that the bearings supporting the shaft are also immersed in the fluid, usually water. It is a common practice to use sleeve bearings, as opposed to ball bearings, in canned motor pumps.

When constructing sleeve bearings, it is desired to achieve a hydrodynamic operating condition, i.e., complete separation of the shaft and the bearing by a fluid film. From a practical point, this is not consistently possible, particularly with small bearings and a lubricant of very low viscosity, such as water. Therefore, what actually occurs is so-called mixed-film lubrication where some contact between shaft and bearing remains and thus some rubbing is constantly present. For this reason, it is important that shaft and bearing materials are carefully selected so that they are compatible and do not undergo excessive wear.

Early pumps used in heating systems utilized shafts made of hardened stainless steel and bearings made of bronze (either solid or sintered). This combination worked well as long as the water (and thus the bearing lubricant) was clean. However, many heating systems suffer from galvanic corrosion due to the presence of copper (in pipes) and iron (in the boiler). The galvanic corrosion product is magnetite (chemical formula $Fe_3O_4$) which is very hard and abrasive. It precipitates out in the form of very fine particles which easily find their way into the bearing clearance where they have often caused severe wear of the stainless steel shaft. Even when hardened to the maximum possible extent, stainless steel is still softer than magnetite. To overcome this problem, shafts made of very hard ceramics such as alumina ceramic (chemical formula $Al_2O_3$) have been used. Unfortunately, the combinations of a bronze bearing and a ceramic shaft resulted in so-called "galling," i.e., the transfer of bronze from the bearing to the shaft, thus destroying the bearing. In the past the bronze of the bearing has been replaced by carbon-graphite (i.e. the bearing system then includes a ceramic shaft and carbon-graphite bearing). An example of the use of carbon-graphite at a bearing surface is found in U.S. Pat. No. 5,549,459. This arrangement provided an improved bearing system. However, carbon-graphite bearings are very expensive.

Accordingly, it is an object of the present invention to provide an improved bearing system that provides a more durable bearing surface, while at the same time providing a bearing system that is relatively inexpensive, particularly in comparison to carbon-graphite bearings.

Another object of the present invention is to provide an improved bearing that is particularly adapted for use in a canned motor pump.

SUMMARY OF THE INVENTION

To accomplish the foregoing and other objects, features and advantages of the present invention there is provided a bearing that is used in a motor pump in which a liquid is not only pumped by means of an impeller driven by the motor, but also is used to lubricate components of the motor pump including the motor pump shaft. The bearing is for supporting the shaft at at least one location of the shaft. The bearing constructed of a bronze material having added thereto a small amount of graphite.

In accordance with other aspects of the present invention the small amount of graphite is in a range of 1% to 10% of the total material comprising the bearing; alternatively the small amount of graphite is in a preferred range of 2.5% to 5% of the total material comprising the bearing; the bearing is constructed using a sintering technique that defines a porosity of the bearing; the graphite is mixed as a powder with a bronze powder prior to sintering or the graphite is impregnated into the bronze after sintering; the motor pump is a canned motor pump and the liquid is the fluid being pumped.

In accordance with another embodiment of the present invention there is provided a method of forming a sleeve type bearing for use in a motor pump in which a liquid is not only pumped by means of an impeller driven by the pump, but also is used to lubricate components of the motor pump including the motor pump shaft. The method comprises the steps of: providing a main bearing component as a bronze powder; providing a small amount of an additive as a graphite powder; wherein the small amount of the additive is less than 10% of the total material of the combined powders; mixing the bronze and graphite powders together to form a composite material; and heating the mixed composite material to form the sleeve type bearing.

In accordance with still other aspects of the present invention the heating step includes sintering the powder mixture; the small amount of graphite is in a range of 1% to 10% of the total material comprising the bearing; the small amount of graphite is in a range of 2.5% to 5% of the total material comprising the bearing; the motor pump is a canned motor pump and the liquid is the fluid being pumped.

In accordance with still a further embodiment of the present invention there is provided a method of forming a sleeve type bearing for use in a motor pump in which a liquid is not only pumped by means of an impeller driven by the pump, but also is used to lubricate components of the motor pump including the motor pump shaft. The method comprises the steps of: providing a main bearing component as a bronze powder; providing a small amount of an additive as a graphite powder; wherein the small amount of the additive is less than 10% of the total material of the combined powders; heating the bronze powder to form the sleeve type bearing; and adding the small amount of graphite to the formed sleeve type bearing.

In accordance with other aspects of the present invention the heating step includes sintering the bronze powder; the graphite is added by impregnating the graphite into the bronze bearing; the small amount of graphite is in a range of 1% to 10% of the total material comprising the bearing; the small amount of graphite is in a range of 2.5% to 5% of the total material comprising the bearing; the motor pump is a canned motor pump and the liquid is the fluid being pumped.

DESCRIPTION OF THE DRAWINGS

Numerous other objects, features and advantages of the present invention should now become apparent upon a reading of the following detailed description taken in conjunction with the accompanying drawings, in which.

DETAILED DESCRIPTION

Figure 1:
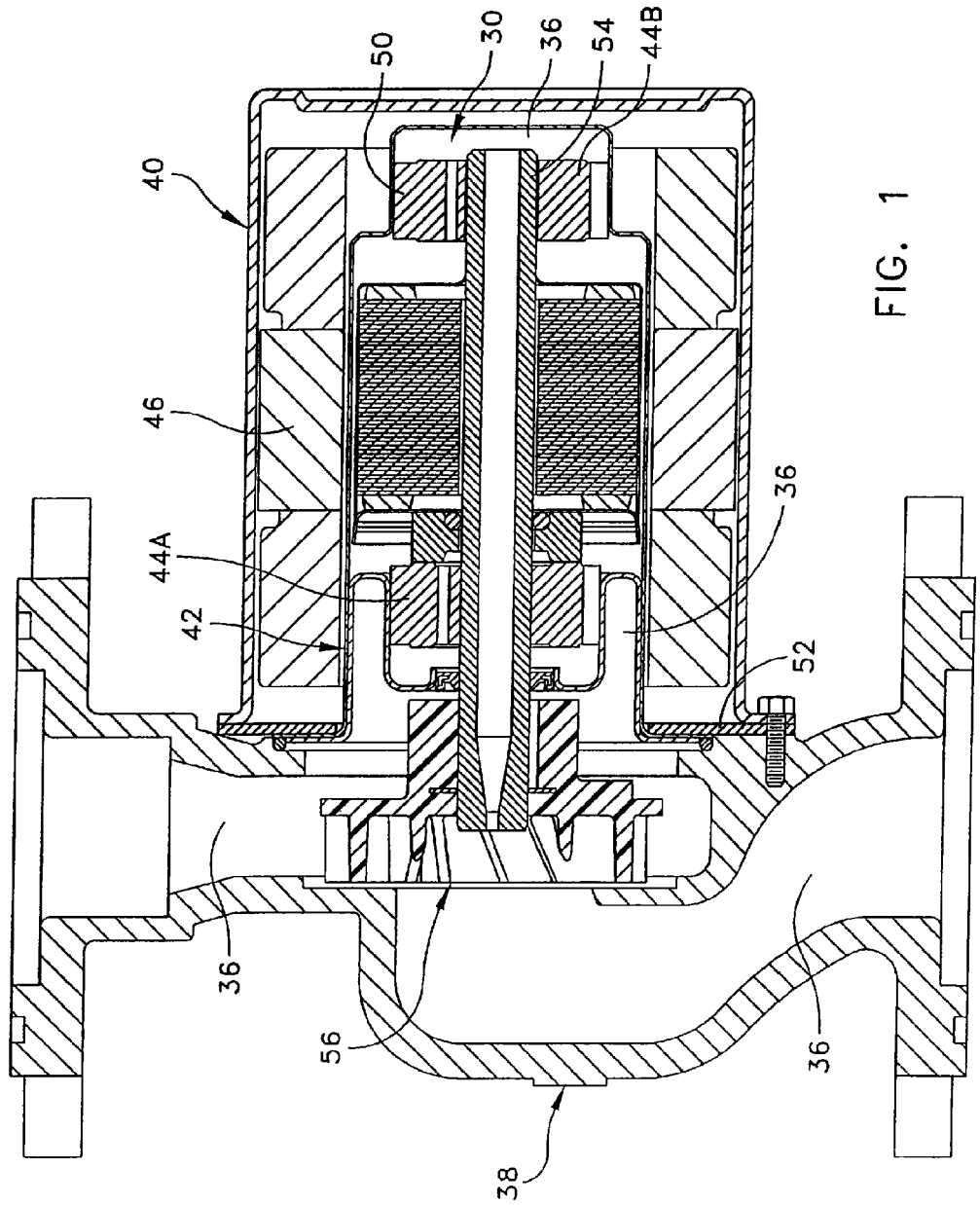
FIG. 1 is a cross sectional view through a canned motor pump that uses the improved bearing of the present invention.
Figure 2:
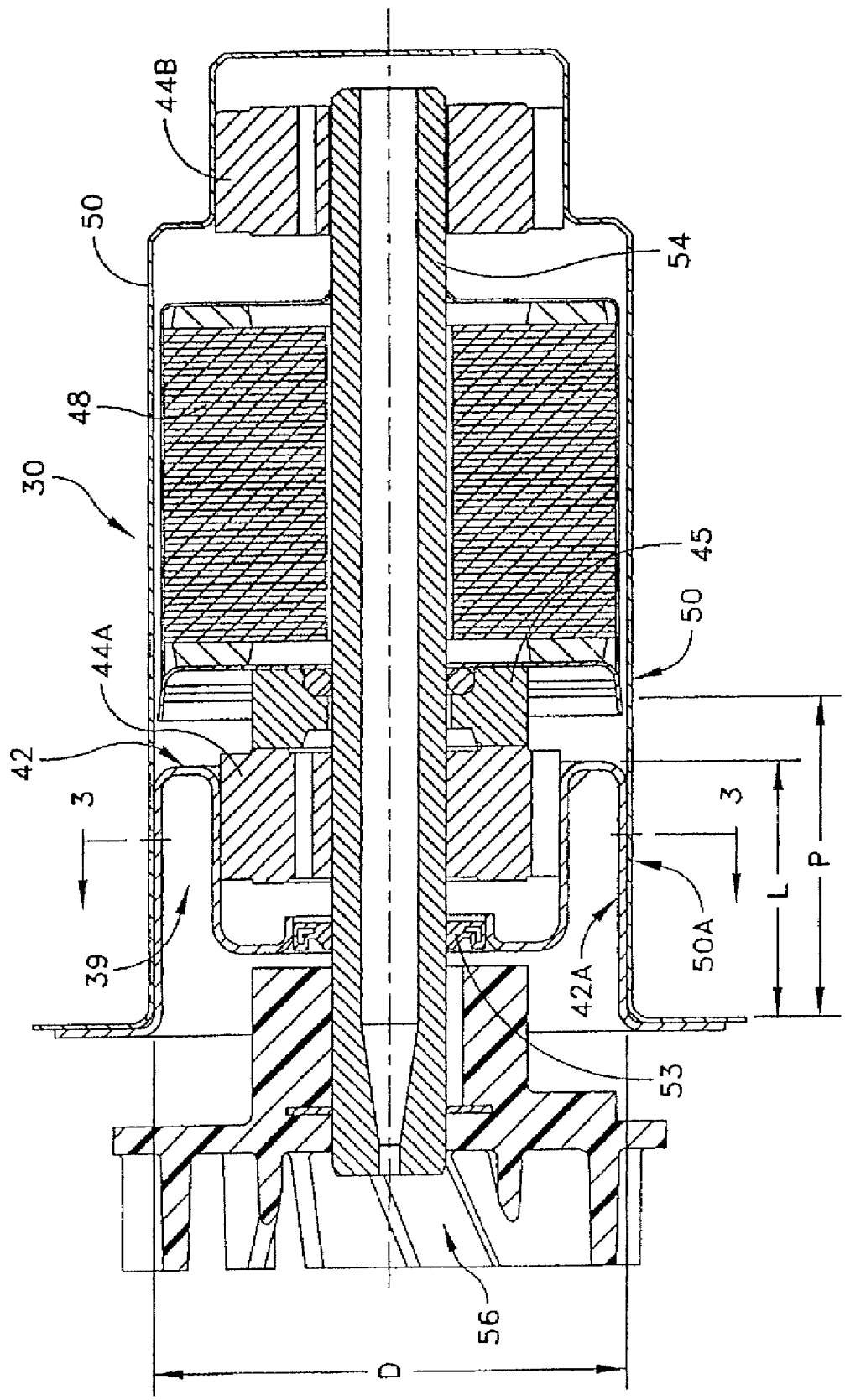
FIG. 2 is an axial cross-sectional view of the cartridge assembly in FIG. 1.

Reference is now made to the cross-sectional views shown in FIGS. 1 and 2. FIG. 1 is a cross sectional view taken through a canned motor pump, and that uses the improved bearing of the present invention. FIG. 2 is an axial cross-sectional view of the cartridge assembly in FIG. 1. It is to be understood that this particular canned motor pump is only shown by way of illustration, and that other canned motor pump structures, or any other motor pump structures may also use the bearing described herein. Furthermore, the principles of the present invention may also apply to other motor and/or pump constructions, and may apply to different locations therein where the improved bearing of the present invention can be used.

The pump illustrated in FIGS. 1 and 2 has been covered in the co-pending application. FIG. 1 is a cross sectional view of a motor pump which is characterized by excellent alignment and field serviceability. FIGS. 1 and 2 show further details of this pump including the pump housing 38, the motor housing 40, the front bearing support 42, as well as sleeve bearings 44A and 44B. Within the motor housing 40 is disposed the stator 46 and adjacent thereto the rotor 48. A sleeve 50 is shown supported between the rotor and stator. The support plate 52 secures the assembly to the pump housing. An O-ring 53 or other elastomeric member is provided between the shaft 54 and the bearing support 42. The shaft 54 holds the rotor and is supported by the two bearings 44A, 44B. The front end of the shaft 54 supports the pump impeller 56. A thrust washer 45 is preferably provided between bearing 44A and the rotor assembly. The rear bearing 44B is mounted in the sleeve 50 and the bearing support 42, to which front bearing 44A is mounted, is fitted to the sleeve 50. Refer to FIG. 2. In the disclosed pump structure the liquid is illustrated at 36 (see FIG. 1), flowing through the pump itself.

In FIG. 2 it is also noted that the bearing support member is preferably constructed with a reverse bend as at 39 in FIG. 2 where, at one side the bearing 44A is mounted, while the opposite side forms the pilot section 42A. Both of these sides are preferably cylindrical. The pilot section 42A is adapted for insertion into the corresponding pilot section 50A of the sleeve 50. There is thus formed an interface surface between the respective pilot sections 42A, 50A extending along dimension L in FIG. 2.

Figure 3:
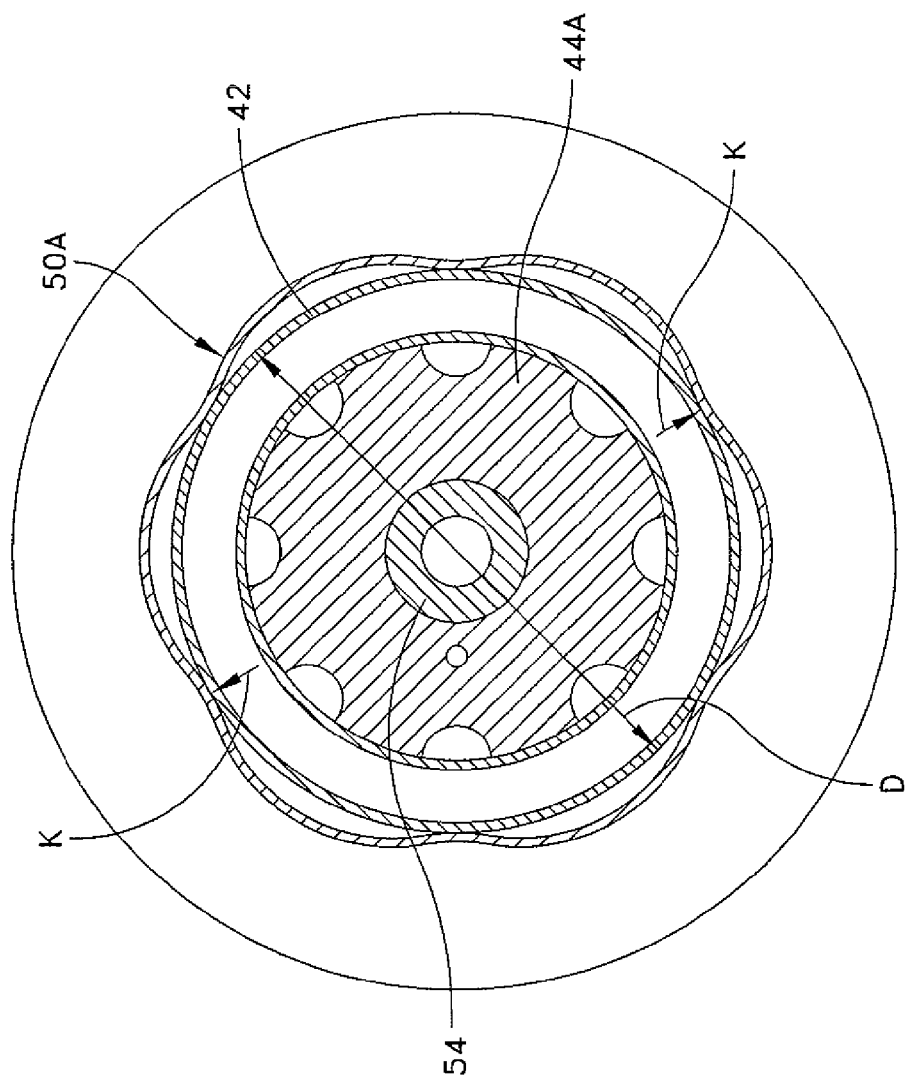
FIG. 3 is a cross-sectional view taken along line 3-3 of FIG. 2.

In accordance with the present invention, rather than providing a press-fit between the bearing support 42 and the sleeve 50, there is provided a pilot section P of the sleeve (see FIG. 2) that has an undulating, wavy shape, instead of a plain circular or cylindrical shape. In this regard refer to the cross-sectional view of FIG. 3 for an illustration of the shape of the sleeve along the length 50A corresponding to the pilot section P. The undulating shape is dimensioned so that a diameter touching the inside low points K (six of them in FIG. 3) of the sleeve length 50A in FIG. 3 is smaller than the outside diameter D of the pilot section L (see FIG. 2) of the bearing support 42. In this way, when pushing the rotor sub-assembly into the sleeve assembly in order to obtain the cartridge illustrated in FIG. 2, the waves or undulations are caused to flatten out to conform to the pilot diameter D of the bearing support 42. The section P preferably extends beyond the section L to assure that there is proper contact between the components. Although reference has been made to contact points, as at K in FIG. 3, because this wave pattern extends along the entire length of the pilot section P (50A) the contact is actually along a line that runs parallel to the shaft axis.

This combination of the wavy or undulating surface of the sleeve with the cylindrical nature of the bearing support thus provides essentially a clearance-less assembly. The wavy shape of the length 51A of the sleeve 50 functions as a radial spring. The sleeve length 50A preferably has a wall thickness in a range on the order of 0.006 to 0.020 inch. Because of the relative thinness of the sleeve wall, particularly along the section 50A, the spring forces are relatively small, allowing ready insertion and removal of the assembly by hand.

The discovery of the present invention is that the addition of a relatively small amount of graphite to a bronze bearing results in a bearing structure that is characterized by improved durability and essentially an elimination of the afore-mentioned "galling". This provides an improved bearing structure at relatively low cost. It has been discovered that by mixing a certain amount of graphite powder with bronze powder and then using the sintering process, bearings can be produced which have proven to work successfully with ceramic shafts, i.e., ceramic shafts are not abraded by magnetite and the addition of graphite to the bronze inhibits the transfer of bronze material to the shaft.

It has been discovered that the addition of as little as 1.0% graphite is sufficient to provide the desired effect. The upper limit on the percentage is at the point where the strength of the bronze matrix of the mix is sufficiently lowered to become a problem. Too much graphite makes the bearing too brittle. The preferred range of percentage of graphite is 1.0% to 10%, and most preferred range is of 2.5% to 5%.

The graphite may be combined with the bronze in basically two different ways. Both techniques include a sintering process. First, a graphite powder may be mixed with a bronze powder in the amounts indicated above, followed by the sintering (heating) process. In addition to mixing graphite with the bronze powder prior to sintering, bearings can be impregnated with graphite after the sintering process has been completed. It should be noted that sintered materials are porous and it is thus possible to impregnate the plain bronze material even after it has been sintered.

Thus, in accordance with the present invention there is the discovery that one can use the combination of graphite and bronze to produce sintered bearings, either by pre-mixing graphite and bronze prior to the sintering process or by impregnation of porous sintered bronze bearings with graphite subsequent to the sintering process. The sintered bronze material is commercially available from Keystone Carbon Company. The material is designated C-62.

Having now described a limited number of embodiments of the present invention it should now be apparent to one skilled in the art that numerous other embodiments and modifications thereof are contemplated a falling within the scope of the present invention. For example, in the embodiment that is disclosed, such as in FIG. 3, there are six valleys (point K). However, greater than or fewer than six may be used. The preferred number of points K is three. The disclosed embodiment also has the undulations on the outer sleeve. However, in an alternate embodiment of the invention the undulations may be in the bearing support member such as along the length L shown in FIG. 2. The material of the sleeve and bearing support is preferably metal, and can be of any number of types of metals.

What is claimed is:

1. A motor pump comprising:
   a pump housing;
   a motor housing;
   a ceramic pump shaft supported in the motor housing and including an impeller extending into the pump housing;
   a rotor-stator structure in the motor housing for driving the shaft;
   a front bearing and a rear bearing for supporting the shaft;
   an annular bearing support member to which the front bearing is mounted;
   a tubular sleeve into which the annular bearing support member is inserted;
   and an interface surface defined between the annular bearing support member and the tubular sleeve and having an undulating surface with separate but multiple contact peak locations disposed between the bearing support member and the tubular sleeve;
   said undulating surface constructed and arranged so as to change from a less flattened out state before the annular bearing support member is inserted into the tubular sleeve to a more flattened out state when the annular bearing support member is inserted into the tubular sleeve to thus provide a spring force between the annular bearing support member and the tubular sleeve;
   said annular bearing support member including an inner annular portion for supporting the front bearing, and an outer annular portion with the undulation surface disposed between the outer annular portion of the annular bearing support member and the tubular sleeve;
   said outer annular portion having a diameter greater than the diameter of the inner annular portion;
   said undulating surface formed integrally with one of the tubular sleeve and annular bearing support member;
   wherein each bearing is constructed of a bronze material, and each bearing has added thereto a small amount of graphite.

2. The motor pump of claim 1 wherein the motor is a canned motor pump in which the fluid that is being pumped passes through the motor housing.

3. The motor pump of claim 1 wherein the bearing support member has a pilot section and the sleeve has a pilot section that includes the undulating surface, the respective pilot sections adapted for relative engagement therebetween.

4. The motor pump of claim 1 wherein the inner annular portion connects with the outer annular portion of the annular bearing support member by means of a reverse bend.

5. The motor pump of claim 4 wherein the undulating surface includes multiple undulations so as to provide multiple contact lines between the tubular sleeve and the annular bearing support member.

6. The motor pump of claim 1 wherein the annular bearing support member has a pilot section and the tubular sleeve has a pilot section with the undulating surface disposed between the respective pilot sections, the respective pilot sections adapted for relative engagement therebetween.

7. The motor pump of claim 6 including a thrust washer between the front bearing and the rotor-stator structure.

8. The motor pump of claim 1 wherein the bearing support member is constructed with a reverse bend.

9. The bearing of claim 1 wherein the small amount of graphite is in a range of 1% to 10% of the total material comprising the bearing.

10. The bearing of claim 9 wherein the small amount of graphite is in a range of 2.5% to 5% of the total material comprising the bearing.

11. The bearing of claim 1 wherein the bearing is constructed using a sintering technique that defines a porosity of the bearing.

12. The bearing of claim 11 wherein the graphite is mixed as a powder with a bronze powder prior to sintering.

13. The bearing of claim 1 wherein the graphite is impregnated into the bronze after sintering.

* * * * *